(12) United States Patent
Foster

(10) Patent No.: US 6,848,569 B1
(45) Date of Patent: Feb. 1, 2005

(54) RECIPROCATING SLAT CONVEYOR WITH FIXED AND MOVABLE SLATS

(75) Inventor: Raymond Keith Foster, Madras, OR (US)

(73) Assignee: Keith Investments, LLC, Madras, OR (US)

( * ) Notice: Subject to any disclaimer, the term of this patent is extended or adjusted under 35 U.S.C. 154(b) by 0 days.

(21) Appl. No.: 10/759,399

(22) Filed: Jan. 14, 2004

(51) Int. Cl.[7] .............................................. B65G 25/04
(52) U.S. Cl. ............................... 198/750.2; 198/750.3; 414/525.1
(58) Field of Search ........................... 198/750.2, 750.3, 198/750.4, 750.5; 414/525.1, 525.9

(56) References Cited

U.S. PATENT DOCUMENTS

| | | | | |
|---|---|---|---|---|
| 4,856,645 A | * | 8/1989 | Hallstrom, Jr. .......... | 198/750.4 |
| 5,323,894 A | * | 6/1994 | Quaeck .................... | 198/750.3 |
| 5,996,772 A | * | 12/1999 | Foster ..................... | 198/750.3 |
| 6,019,215 A | * | 2/2000 | Foster ..................... | 198/750.3 |
| 6,129,299 A | * | 10/2000 | Jackson et al. .......... | 241/185.5 |
| 6,257,396 B1 | * | 7/2001 | Quaeck ..................... | 198/750.3 |
| 6,739,447 B2 | * | 5/2004 | Verhaeghe ................ | 198/750.1 |
| 6,782,994 B1 | * | 8/2004 | Foster ..................... | 198/750.2 |

* cited by examiner

Primary Examiner—Gene O. Crawford
(74) Attorney, Agent, or Firm—Delbert J. Barnard

(57) ABSTRACT

A reciprocating slat conveyor is composed of laterally spaced apart movable conveyor slats (10) and fix conveyor slats (12) laterally between the movable slats (10). The movable slats (10) are clamped to transverse drive beams (56) by clamp structure that includes an upper clamp member (62) and a lower clamp surface (70) carried by the transverse drive beam (56). Bottom flanges (66, 68) on channel members (60) are clamped between the clamp member (72) and the clamp surface (70). The channel member (60) is connected to a central portion (32) depending from the movable slat top wall (14, 16). Portions (30, 32) carry bottom members (34) having side portions (36, 38). The side portions (36, 38) are in contact with lower bearing surfaces (42, 44). The top wall members (14, 16) of the conveyor slats (10) rest on the upper portions of the bearings (28, 30). An apron (84) extends laterally across the rear end portion of the conveyor. Apron (84) slopes downwardly and rearwardly from the front end (86) to a rear end (88). The movable conveyor slats (10) have rear end portions which move back and forth above a space defined by the apron (84) and a rear door (82) on the conveyor.

14 Claims, 3 Drawing Sheets

RECIPROCATING SLAT CONVEYOR WITH FIXED AND MOVABLE SLATS

TECHNICAL FIELD

This invention relates to reciprocating slat conveyors. More particularly, it relates to reciprocating slat conveyors composed of laterally spaced apart movable conveyor slats and laterally spaced apart fixed conveyor slats located between the movable conveyor slats, and to a bearing and support system for mounting the movable conveyor slats for longitudinal movement. The Invention also relates to an improved manner of connecting the movable conveyor slats to transverse drive beams and to a rear end construction of the conveyor that facilities the conveyor's handling of certain bulk materials.

BACKGROUND OF THE INVENTION

My U.S. Pat. No. RE 35,022, granted Aug. 22, 1995, and entitled Reduced Size Drive-Frame Assembly For A Reciprocating Slat Conveyor, discloses a reciprocating slat conveyor in which the conveyor slats are connected to transverse drive beams which are in turn connected to linear hydraulic motors. The linear hydraulic motors move the drive beams and the drive beams move the conveyor slats that are connected to them.

My U.S. Pat. No. 5,350,057, granted Sep. 27, 1994, and entitled Ball Block For Mounting Linear Motor, discloses a reciprocating slat conveyor in which the transverse drive beams are physically separated from the linear hydraulic motors. The linear hydraulic motors are connected to selected conveyor slats that are directly driven by the linear hydraulic motors. The driven conveyor slats are connected to additional conveyor slats by the transverse drive beams.

My U.S. Pat. No. 6,409,009, granted Jun. 25, 2002, and entitled Conveyor Slat Connector And Connection Method, and my U.S. Pat. No. 6,575,293, granted Jun. 10, 2003, and entitled Connector And Connection Method For Conveyor Slats, each discloses apparatus for connecting conveyor slats to transverse drive beams. In the connectors of these patents, bottom flanges on the conveyor slats are clamped between upper and lower clamp members which are in turn secured to the transverse drive beams.

My U.S. Pat. No. 5,044,807, granted Sep. 3, 1991, and entitled Method For Collecting And Compacting Garbage And Then Loading It Into A Road Vehicle, discloses a reciprocating slat conveyor composed of laterally spaced apart moving conveyor slats and laterally spaced apart fixed conveyor slats that are located between the movable conveyor slats.

The present invention provides an improvement on the conveyor that is disclosed by this patent. The improvement includes use of some technology disclosed in my above introduced U.S. Pat. Nos. 5,350,057; 6,409,009; 6,575,293 and Re 35,022, in addition to new technology. The contents of these four patents, and the contents of U.S. Pat. No. 5,044,870, are incorporated herein by this specific reference.

SUMMARY OF THE INVENTION

The reciprocating slat conveyor of the present invention is basically characterized by a pair of laterally spaced apart, first and second support members, each having an upper portion. A first bearing is supported on and by the first support member. A second bearing is supported on and by the second support member. Each bearing has an upper bearing surface and a lower bearing surface. A longitudinal conveyor slat is provided that has a central portion disposed generally between the first and second support members. It also has opposite side portions that project laterally outwardly from the central portion. One of the side portions has a top wall that rest on the upper bearing surface of the first bearing. The second side portion of the conveyor slat has a top wall that rest on the upper bearing surface of the second bearing. The conveyor slat also has a bottom member that is positioned below and confronts the lower bearing surface of the first bearing. It also has a bottom member that is positioned below and confronts the lower bearing surface of the second bearing. The conveyor slat is adapted to move endwise on the support members and bearings. Upward movement of the conveyor slat is resisted by contact between the bottom members and the lower bearing surfaces that occurs when the conveyor slats start to move upwardly.

A typical installation includes a third support member laterally spaced from the second support member in the direction opposite from the first support member. The second and third support members include and support a fixed conveyor slat that extends laterally between the second and third support members. Preferably, the fixed conveyor slat has first and second side portions. The first side portion is supported on and by the upper portion of the second support member. The second side portion is supported on and by the upper portion of the third support member.

According to an aspect of the invention, the second bearing has an upper portion that extends over the first side portion of the fixed conveyor slat. This upper portion includes the upper bearing surface for the second bearing. The third bearing has an upper portion that extends over the second side portion of the fixed conveyor slat and includes an upper bearing surface.

According to another aspect of the invention, the bottom member of the movable conveyor slat has a central portion that is flanked by first and second side portions. The first side portion is below and confronts the lower bearing surface of the first bearing. The second side portion is positioned below and confronts the lower bearing surface of the second bearing. In preferred form, the first and second side portions of the bottom member are in the nature of leaf springs and are in contact with the lower bearing surfaces of the first and second bearings. In one embodiment, the reciprocating slat conveyor comprises a transverse drive beam and at least one longitudinal conveyor slat extending perpendicular to the transverse drive beam. A channel member is provided that has a top wall, side walls depending from the top wall, and bottom flanges extending laterally inwardly from the side wall. The top wall, the side walls and the bottom flanges define a space that is below the top wall, between the side walls, and above the bottom flanges. The conveyor slat including a central bottom portion that is connected to the top wall of the channel member. A clamp member is located in the space in the channel member. The clamp member has edge portions that are above the bottom flanges of the channel member. A fastener connects the clamp member to the transverse drive beam. The edge portions of the clamp member make contact with the bottom flanges of the channel member. As a result, the bottom flanges on the channel member are clamped by and between the clamp member and the transverse drive beam.

In preferred form, the portion of the transverse drive beam between which the bottom flanges of the channel member are received include complementary recesses and projections. Each projection pushes a portion of a bottom flange into a complementary recess.

A further aspect of the invention is to provide a reciprocating slat conveyor that comprises a plurality of laterally spaced apart movable slats and a plurality of laterally spaced apart fixed slats that are between the movable slats. The movable slats have a forward position and a rearward position between which they reciprocate. The conveyor includes a rear end section that includes an apron that slopes downwardly and rearwardly. A door is provided at the rear of the apron. The rear position of the movable slats is closer to the rear end of the apron than to the front end of the apron. The forward position of the movable slats is closer to the front end of the apron than it is to the rear end of the apron. Rearward movement of the movable conveyor slats will move a material that is on the movable slats into a region between the front and the rear ends of the sloping apron, and such a material will move rearwardly off of the conveyor slats into a prism shaped space defined by and between the sloping apron and the rear door.

The various features and aspects of the invention can be used together or separately. Also, other objects, advantages and features will become apparent from the description of the best mode set forth below, from the drawings, from the claims and principles that are embodied in the specific structures that are illustrated and described.

BRIEF DESCRIPTION OF THE SEVERAL VIEWS OF THE DRAWING

In the drawing, like reference numerals, designate like parts throughout the several views, and.

DETAILED DESCRIPTION OF THE INVENTION

Figure 1:
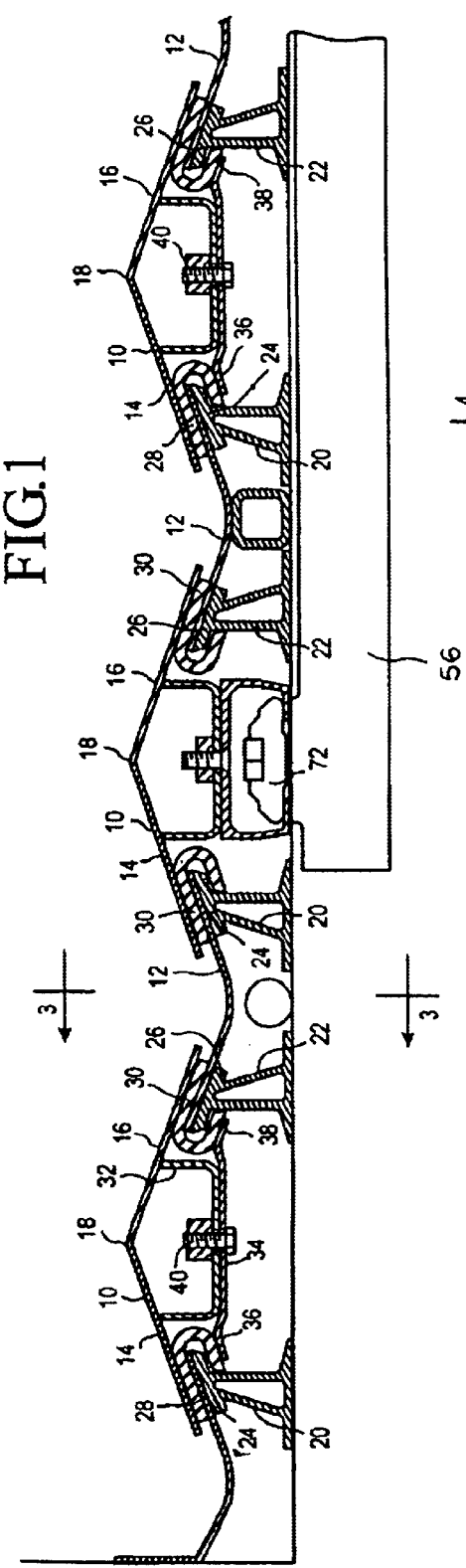
FIG. 1 is a transverse sectional view taken substantially along line 1,2—1,2 of FIG. 4, such view showing three movable slats and at least portions of four fixed slats that together form a floor for a reciprocating slat conveyor.
Figure 2:
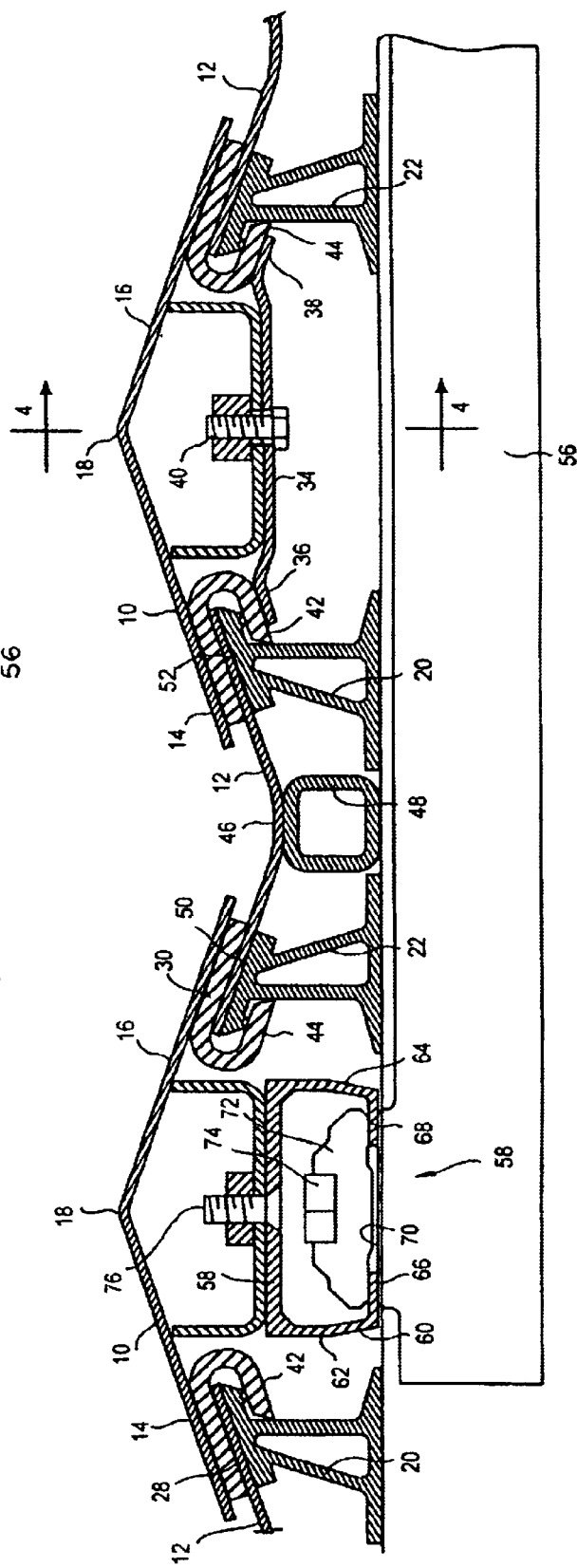
FIG. 2 is an enlarged scale view of a portion of FIG. 1 that includes two of the three movable slats shown in FIG. 1.

My aforementioned U.S. Pat. No. 5,044,870 discloses a reciprocating slat conveyor (RF II) within a container that receives bulk material 24. The conveyor extends substantially the full length of the container. FIGS. 7 and 8 of that patent show transverse sectional views through the conveyor. FIG. 9 shows a fragmentary end view of the conveyor. FIGS. 1 and 2 herein are views like FIGS. 7–9 of U.S. Pat. No. 5,044,870. They show movable conveyor slats 10 that are laterally spaced apart and show fixed conveyor slats 12 that are laterally spaced apart and are between the movable slats 10. The movable slats 10 are V-shaped in cross section and are composed of side portions 14, 16 that slope outwardly and downwardly from an apex 18. Slat parts 14, 16 together form a top wall 14, 16.

The conveyor comprises a plurality of laterally spaced apart support members 20, 22. Members 20, 22 have upper portions 24, 26 that provide support for bearings 28, 30. Support members 20, 22 may be continuous members extending substantially the full length of the conveyor. Or, they can be a plurality of shorter members arranged end-to-end, with or without spaces between the members. Bearings 28, 30 are preferably continuous members or are elongated members that are positioned end-to-end so that together they extend substantially the full length of the conveyor.

Figure 4:
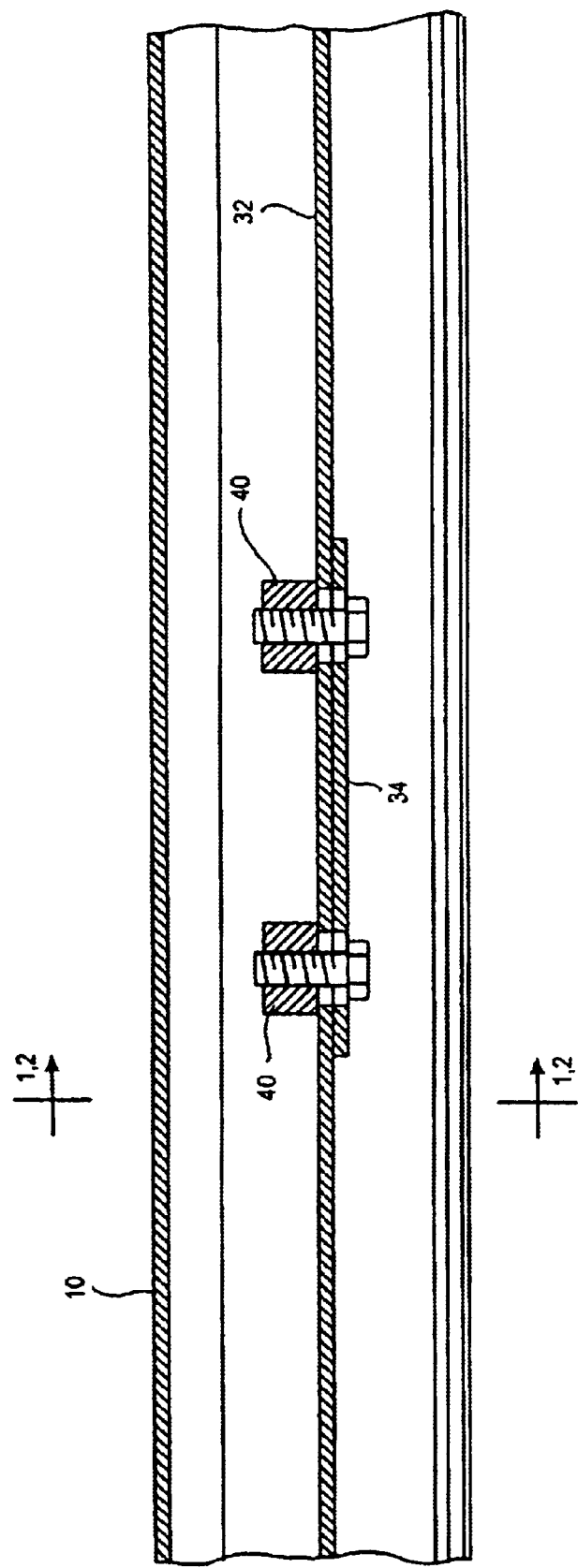
FIG. 4 is a fragmentary sectional view taken substantially along line 4—4 of FIG. 2.

Each pair of adjacent support members 20, 22 define a space between them in which a central portion of a movable conveyor slat 10 is received. This movable central portion may comprise a U-shaped reinforcement member 32 that has sidewalls and a bottom wall. The tops of the sidewalls are connected to the floor member 14, 16, such as by welding. Preferably member 32 extends the full length of the slat 10. Each movable slat 10 also includes a bottom member 34 having opposite side portions 36, 38 that are in effect leaf springs. The members 34 may be relatively short in length (FIG. 4) and be longitudinally spaced apart along the slats 10. Nut and bolt assemblies 40 are used to secure the bottom members 34 to the bottom wall of the reinforcement member 32.

Bearings 28, 30 include upper surfaces that are contacted by the side portions of the slat wall 14, 16. Bearings 28, 30 also include lower bearing surfaces 42, 44. The side parts 36, 38 of the bottom members 34 have upper surfaces that confront the lower bearing surfaces 42, 44. Preferably, the side portions 36, 38 of the bottom members 34 are spring loaded against the bottom bearing surfaces 42, 44. That is, the side portions 36, 38 are biased upwardly and when the slats 10 are installed, the bearings 28, 40 push down on the side portions 36, 38. The bearings 28, 40 are preferably made from a self lubricated plastic material, the use of which is standard in the reciprocating slat conveyor art.

As best shown by FIG. 2, the fixed slats 12 extend laterally between adjacent supports 22, 20. Fixed slats 12 have a shallow V-shaped cross section with a central valley portion 46 that is connected to a longitudinal support beam 48. The opposite side portions 50, 52 of the fixed slats 12 are secured to the upper portions 24, 26 of the support members 20, 22. The longitudinal support beams 48 cross over and are supported on the tops of transverse frame beams 52 (FIG. 3).

According to an aspect of the invention, every third movable conveyor slat 10, laterally across the width of the conveyor, is connected to one of three transverse support beams. In FIGS. 1 and 2, one of the support beams is designated 56. One of the movable conveyor slats 10 is shown connected to transverse drive beam 56 by a clamp structure 58 that is like one of the clamp structures disclosed in the aforementioned U.S. Pat. Nos. 6,409,009 and 6,575,293. According to an aspect of the invention, each movable conveyor slat 10 is connected to the top wall 58 of a channel member 60 that is like the floor slats 70 disclosed in U.S. Pat. No. 6,575,293. Channel member 60 has the top wall 58, a pair of side walls 62, 64 and a pair of bottom flanges 66, 68. Bottom flanges 66, 68 extend laterally inwardly from the lower edges of the side walls 62, 64, in cold planar parallelism. Flanges 66, 68 are positioned vertically between a lower clamp surface 70 and an upper clamp surface that is a part of clamp member 72.

As disclosed in U.S. Pat. No. 6,575,293, the clamp surfaces include complementary projections and recesses. The flanges 66, 68 are vertically between the projections and recesses. A series of clamp nuts, one of which is designated 74 in FIG. 2, connect the upper clamp member 72 to the transverse drive beam 56. When the bolts 74 are tightened, the clamp member 72 is moved towards the transverse drive beam 56. The projections on the clamp member 72 move relatively into the recesses in the clamp surface 70 and the projections on the clamp surface 70 move into recesses on the clamp member 72. The projections and recesses deform the flanges 66, 68 in the manner disclosed in U.S. Pat. No. 6,575,293. The U-shaped channel member 60 is thus formerly connected to the transverse drive beam 56. A series of nut and bolt assemblies 76 connect the top walls 58 of the channel member 60 through the bottom wall of the U-shaped reinforcement member 32. Accordingly, the movable conveyor slat 10 and its channel member 60 are secured to the transverse drive beam 56.

Figure 3:
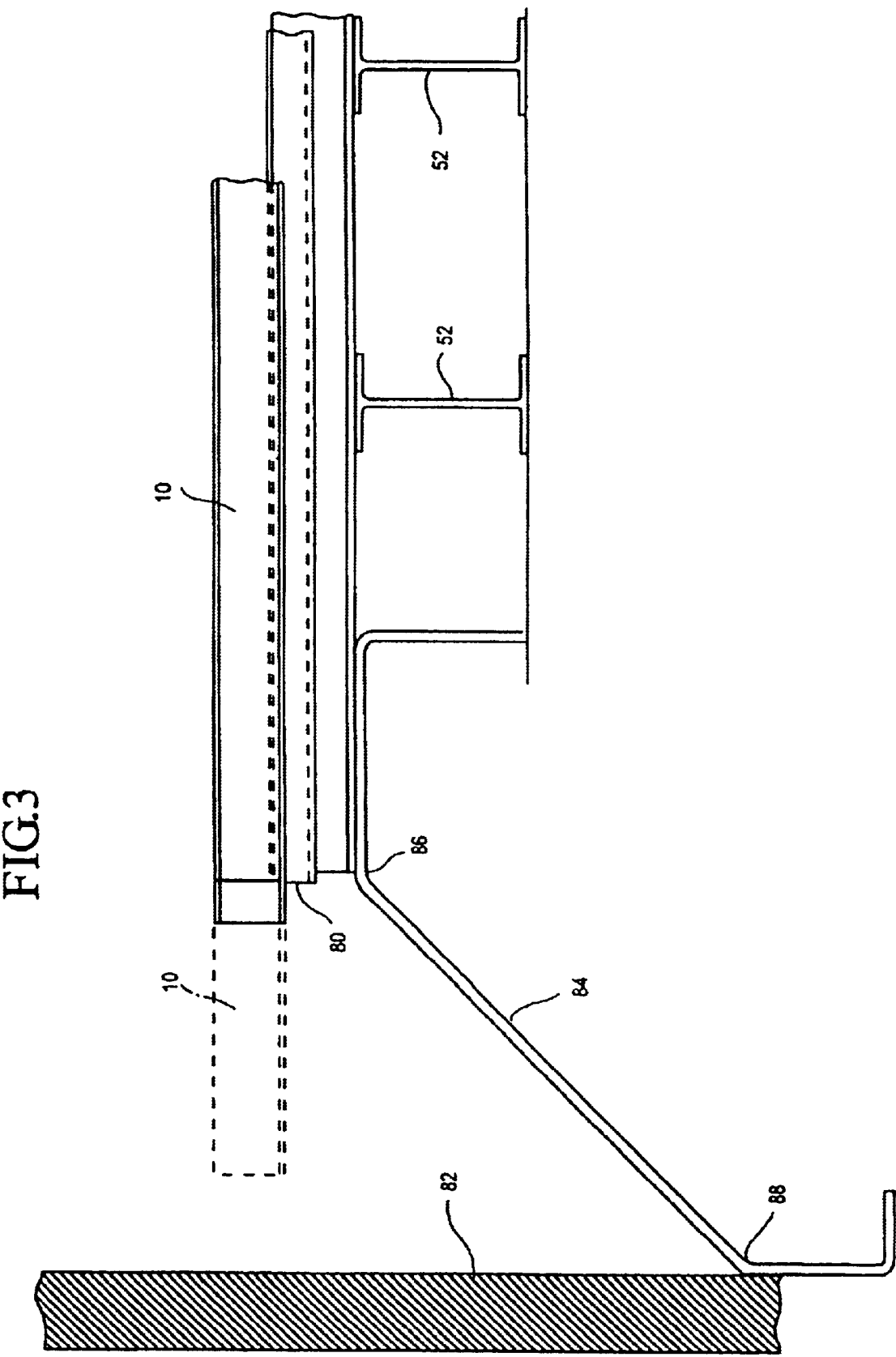
FIG. 3 is a fragmentary longitudinal sectional view, with some parts in side elevation, taken substantially along line 3—3 of FIG. 1, such view including a broken line showing of one of the movable conveyor slats in a fully extended position over a trough formed by a door at the rear of the conveyor compartment and a downwardly and rearwardly sloping apron.

FIG. 3 is a longitudinal sectional view through a rear portion of the conveyor. It includes a solid line showing of a conveyor slat 10 in a forward position and a broken line showing of the same conveyor slat 10 in a rearward position. The end region 80 of the support structure for the conveyor slat 10 is shown spaced forwardly from a rear door 82. Door 82 extends across the full width of the back end of the conveyor. In FIG. 3, door 82 is shown in a closed position. Door 82 is preferably hinge connected so that it can be swung open so that the contents of a conveyor can be discharged out of a rear opening in the trailer box or other container in which the conveyor is mounted. As shown by FIG. 3, an apron 84 slopes downwardly and rearwardly from a front end 86 to a rear end 88. Apron 84 is a flat plate member that extends laterally across the full width of the conveyor. When the slats 10 are moved forwardly, their rear ends are closely adjacent the upper front end 86 of the apron 84. When the conveyor slats 10 are in a rearward position, they are closer to the door 82 and the rear end portion 88 of the apron 84 than they are to the front end portion 86 of the apron 84. Material on the conveyor will be discharged rearwardly off of the rear end of the conveyor into the region formed by and between the door 82 and the apron 84. This region is in the shape of a triangular prism. When the door 82 is closed, this region will fill up with the material being conveyed. Then, when the floor 82 is opened, the conveyor slats 10 will move material rearwardly over the apron 84.

As is well known in the art, a separate linear hydraulic motor is connected to each transverse drive beam. In a conveyor that includes three transverse drive beam, there are three linear hydraulic motors. The movable components of the linear hydraulic motors are connected to the transverse drive beams. The stationary components are connected to a portion of the frame structure in which the conveyor is supported. Alternatively, the movable components of the linear hydraulic motors may be connected to portions of three different movable conveyor slats, one from each of the three sets of movable conveyor slats. Then, the conveyor slats for each set can be connected together by a transverse drive beam that is spaced axially from the linear hydraulic motors. In this embodiment, the transverse drive beam serves to connect the driven slat (the slat that is connected to the linear hydraulic drive motor) to the remaining slats of the set.

The illustrated embodiments are only examples of the present invention and, therefore, are non-limitive. It is be understood that many changes in the particular structure, material and feature of the invention made be made without departing from the spirit and scope of the invention. Therefore, it is my intention that my patent rights not be limited by the particular embodiments that are illustrated and described herein, but rather are to be determined by the following claims, interpreted according to accepted doctrines of patent claim interpretation, including use doctrine of equivalents and reversal of parts.

What is claimed is:

1. A reciprocating slat conveyor, comprising:

a pair of laterally spaced apart, first and second support members, each having an upper portion:

at least one bearing supported on and by first support member;

at least one bearing supported on and by the second support member;

each said bearing having an upper bearing surface and a lower bearing surface;

a longitudinal conveyor slat having a central portion disposed generally between the support members and opposite side portions projecting laterally outwardly from the central portion, one said side portion having a top wall in contact with the upper bearing surface of the bearing on the first support member, and a bottom member confronting the lower bearing surface of the same bearing;

the other side portion having a top wall in contact with the upper bearing surface of the bearing on the second support member, and a bottom member confronting the lower bearing surface of the same bearings;

wherein the reciprocating slat moves back and forth endwise, on said bearings;

said slat conveyor further comprising a third support member laterally spaced from the second support member in the direction opposite the first support member, wherein the second and third support members include and support a fixed conveyor slat that extends between the second and third support members;

wherein the fixed conveyor slat has first and second side portions, said first side portion is supported on and by the upper portion of the second support member and the second side portion is supported on and by the upper portion of the third support member.

2. The reciprocating slat conveyor of claim 1, wherein the second bearing has an upper portion that extends over the first side portion of the fixed conveyor slat, and said upper portion included the upper bearing surface for the second bearing.

3. The reciprocating slat conveyor of claim 2, comprising a third bearing supported on and by said third support member, said third bearing having an upper portion that rests on the second side portion of the fixed conveyor slat and includes an upper bearing surface.

4. The reciprocating slat conveyor of claim 1, wherein the bottom member of the conveyor slat a central portion that is flanked by first and second side portions, wherein the first side portion is below and confronts the lower bearing surface of the first bearing, and the second side portion is positioned below and confronts the lower bearing surface of the second bearing.

5. The reciprocating slat conveyor of claim 4, wherein the first and second side portions of the bottom wall are in nature of leaf springs and are in contract with the lower bearing surfaces of the first and second bearings.

6. The reciprocating slat conveyor of claim 4, wherein the central portion of the conveyor slat includes a channel member having side flanges and an interconnecting bottom web that is connected to a central portion of the bottom wall.

7. A reciprocating slat conveyor, comprising a transverse drive beam;

at least one longitudinal conveyor slat connected to the transverse drive beam, said conveyor slat including a top wall;

a channel member having a top wall, side walls depending from the top wall, and bottom flanges extending inwardly from the side walls, said top wall, said side walls and said bottom flanges defining a space that is below the top wall, between the side walls and above the bottom flanges;

a clamp member in said space having edge portions that are above the bottom flanges of the channel member; and a fastener connecting the clamp member to the transverse drive beam, with the edge portions of the clamp member making contact with the bottom flanges of the channel member, wherein the bottom flanges of the channel member are clamped by and between the clamp member and the transverse drive beam.

8. The reciprocating slat conveyor from claim 7, when the portions of the clamp member and the transverse drive beam between which the bottom flanges of the channel member are received include complementary recesses and projections, wherein each projection pushes a portion of a bottom flange into a complementary recess.

9. A reciprocating slat conveyor comprising a plurality of laterally spaced apart movable slats and a plurality of laterally spaced apart fixed slats that are between the movable slats, and said movable slats having a forward position and a rearward position;

said conveyor including a rear end portion that includes an apron that slopes downwardly and rearwardly;

a door at the rear end of the apron;

said rear position of the movable slats being closer to the rear end of the apron than to the front end of the apron;

said forward position of the movable slats being closer to the front end of the apron than it is to the rear end of the apron; and wherein rearward movement of the movable conveyor slats will deposit a material on the movable slats from the movable slat, into a region on the slopping apron between it and the door.

10. The reciprocating slat conveyor of claim 9, wherein the fixed slats have opposite side portions, and bearings are supported on and by the side portions of the fixed slats, and said movable slats have side portions of the fixed slats, and said movable slats have side portions that contact the bearings and slide on the bearings.

11. The reciprocating slat conveyor of claim 10, wherein the bearings have lower surfaces and the movable slats have bottom members that include portions that are below and confront the lower surfaces of the bearings.

12. The reciprocating slat conveyor of claim 11, wherein the side portions of the bottom members are in the nature of leaf springs that are spring biased against the lower surfaces of the bearings.

13. A reciprocating slat conveyor, comprising a plurality of parallel conveyor slats composed of laterally spaced apart movable conveyor slats and laterally spaced apart fixed conveyor slats between the movable conveyor slats;

said fixed conveyor slats having a V-shaped cross-section formed by side portions that extend upwardly and outwardly from a valley;

said movable conveyor slats having a V-shaped cross-section formed by side portions that slope outwardly and downwardly from an apex;

said side portions of the movable conveyor slats being positioned above side portions of the fixed conveyor slats;

a plurality of transverse drive beams positioned below the fixed and movable slats;

said movable conveyor slats being divided into sets equal in number to the transverse drive beams, wherein the movable slats of each set are connected to a transverse beam for that set;

each said transverse drive beam being movable below the fixed conveyor slats and the movable conveyor slats to which it is not connected.

14. The reciprocating slat conveyor of claim 13, wherein the fixed conveyor slats include longitudinal beams which extend over the transverse drive beams.

\* \* \* \* \*